3,667,906
METHOD FOR PRODUCING MANGANESE DI-
OXIDE CONTAINING LESS POTASSIUM
Seiya Sasaki, Yamagata, Japan, assignor to Tekkosha
Co., Ltd., Tokyo, Japan
No Drawing. Filed May 11, 1970, Ser. No. 36,417
Claims priority, application Japan, May 15, 1969,
44/36,995
Int. Cl. C01g 45/02; B01k 1/00
U.S. Cl. 23—145         3 Claims

ABSTRACT OF THE DISCLOSURE

An ore containing a decreased amount of potassium is obtained by reducing-roasting manganese oxide ores containing potassium, thereby converting manganese components in the ores into MnO, and removing potassium components from the reduced-roasted ores by extracting them with water at elevated temperatures. Into the resulting ore containing the decreased amount of potassium is added an acid to extract the manganese components and, furthermore, by oxidizing the manganese components in the second extract thus obtained electrolytically or with an oxidizing agent, manganese dioxide containing less potassium can be obtained.

BACKGROUND OF THE INVENTION

(1) Field of the invention

This invention relates to a method for producing manganese dioxide containing less potassium by an electrolytic method (hereinafter, manganese dioxide produced by this method is referred to as "electrolytic manganese dioxide") or by a synthetic method (hereinafter, the same produced by this method is referred to as "synthetic manganese dioxide").

(2) Description of the prior art

It is hitherto known that a battery or a ferrite produced by the use of manganese dioxide containing potassium as the raw material has poor performance.

As is well known, there are various kinds of manganese ores and manganese slags as sources of manganese, and manganese oxide ores such as pyrolusite, psilomelane, braunite and manganite are widely distributed in the earth's surface. It is very advantageous in industry to produce an electrolytic or synthetic manganese dioxide containing less potassium from those manganese oxide ores as raw materials in view of the ready availability, high manganese content and cheapness of these ores.

Manganese oxide ores, however, generally contain relatively large amounts of potassium, usually from 0.5% to 2.5% by weight of potassium based on the total weight of the ores. Hereinafter, percentage values refer to wt./wt. percent unless otherwise stated. Although there are some ores containing less potassium, the availability thereof is extremely small in comparison with the ores containing higher amounts of potassium. Therefore, rhodochrosite and rhodonite which contain extremely small amounts of potassium are used as raw materials for making electrolytic or synthetic manganese dioxide. But it is very difficult to obtain these manganese ores because of the small reserves and availability thereof.

SUMMARY OF THE INVENTION

The main object of this invention is to provide a method for producing manganese dioxide containing less potassium from manganese oxide ore containing relatively a high amount of potassium as a raw material.

Another object of this invention is to provide a method for producing manganese dioxide containing less potassium economically by removing potassium components from manganese oxide ore containing potassium without substantial loss of the manganese components.

According to the present invention, there is provided a method for producing manganese dioxide containing less potassium, which comprises reducing-roasting manganese oxide ore, thereby converting the manganese components in the ore into MnO, extracting the potassium components in the reduced-roasted ore with water at elevated temperatures to remove the potassium components therefrom, adding an acid to the ore containing reduced amount of potassium, thereby dissolving and extracting MnO in the ore, purifying the thus obtained extract containing manganese ion, and thereafter oxidizing the manganese ion in the extract electrolytically or with an oxidizing agent to obtain manganese dioxide.

During the step for extracting the potassium components with water, the pH of the extracting liquid increases with the dissolution of the potassium components into the extracting liquid. If, at this time, the increase of the pH is suppressed, the potassium components are extracted with water even at relatively lower temperature. For suppressing the pH-increase, additions of an acid or the like are effective.

The reducing-roasting of the manganese oxide ores is carried out by pulverizing the ores, mixing the pulverized ores with a reducing material such as heavy oil, carbon material or the like, and roasting the mixture in a furnace such as a rotary kiln. The amount of the reducing material added should be at least that necessary for substantial reducing $MnO_2$ and $Mn_2O_3$ in the manganese oxide ore to MnO, of which the first oxide is insoluble in a dilute acid and the second partially insoluble. This amount is calculated stoichiometrically according to the following equation:

$$MnO_2 + \tfrac{1}{2}C = MnO + \tfrac{1}{2}CO_2 \quad (1)$$
$$Mn_2O_3 + \tfrac{1}{2}C = 2MnO + \tfrac{1}{2}CO_2 \quad (2)$$
$$MnO_2 + 2H = MnO + H_2O \quad (3)$$
$$Mn_2O_3 + 2H = 2MnO + H_2O \quad (4)$$

On calculation the amounts of carbon and hydrogen are those of these atoms contained in the reducing agent.

In the practical operation, there is needed an amount of from 1.2 to 1.5 times of the reducing agent based on thus calculated amount of the same. The use of an ore containing ferric oxide, which is reduced with reducing agent as well as $MnO_2$ or $Mn_2O_3$, may result in further consumption of the reducing agent, and thus, $Mn_2O_3$, may remain in the ore, if a sufficient excess amount of reducing agent is not added. However, this residual $Mn_2O_3$ is easily reduced with the thus formed ferrous oxide and dissolved into the extracting acid, during the subsequent step of extracting the manganese components in the ore with an acid, according to the reaction shown in the following Equation 5 without any trouble:

$$Mn_2O_3 + 2Fe^{++} + 6H^+ = 2Fe^{+++} + 2Mn^{++} + 3H_2O \quad (5)$$

The temperatures employed in the reducing-roasting vary depending on the type of the ores used, but are preferably within the range from 400° C. to 1,200° C. The potassium components in the reduced-roasted product are extracted by mixing the product with water sufficiently to prepare a slurry thereof, agitating the slurry by suitable means such as stirring or shaking at elevated temperatures and separating the solid phase from the liquid phase by suitable means such as filtration. The amount of the water used in this step is not limited particularly, but from 1 to 3 times thereof based on the total weight of the reduced-roasted product is sufficient. The higher the temperature of the extracting liquid is, the more efficient extraction thereof is carried out. Generally, the temperature is preferably more than 100° C. The potassium components in the ores are more effectively extracted, if the pH of the extracting liquid is adjusted to be preferably less than 11.5 but not less than 8.0 by adding an acid or the like. The lower the pH of the extracting liquid is, the more easily is performed the extraction of potassium components. However, the pH of the extracting liquid of less than 8.0 is not preferable because the same causes partial dissolution of the manganese components.

An electrolytic or synthetic manganese dioxide containing less potassium can be obtained by mixing the thus obtained ores containing a decreased amount of potassium with a mineral acid to dissolve the manganese components into the acid, removing iron components from the solution according to a conventional method, removing, if necessary, components of heavy metals such as copper, nickel, cobalt, arsenic, antimony or the like, and then oxidizing the manganese ion in the product solution electrolytically or with an oxidizing agent.

As the acid for extracting the manganese components, a mineral acid such as sulfuric acid, hydrochloric acid, nitric acid or the like is preferably used. In the case of utilizing an electrolytic oxidation, sulfuric acid is preferred. The concentration of the acid is not limited but for easy operation more than 5% is preferred. As the oxidizing agent for oxidizing manganese ion into synthetic manganese dioxide, persulfates, perchlorates, hypochlorites, air or the like are used.

According to the present invention, electrolytic or synthetic manganese dioxide containing less potassium can be produced economically from manganese oxide ores containing relatively a large amount of potassium, since potassium components can be removed without substantially losing manganese components.

Now the present invention is further illustrated by the following examples in more detail.

Example 1.—A manganese oxide ore containing 1.0% of potassium, 38.0% of manganese dioxide, 14.2% of manganese monoxide, 20.7% of silica, 4.75% of ferric oxide, 1.13% of alumina, 0.029% of sulfur and 0.18% of phosphorus, based on the amount of the manganese ore was pulverized to powder having a particle size of less than 40 mesh, and into the powdered ore was added heavy oil as a reducing agent in the ratio of 32 ml. of the ore to 1 kg. of the ore. The mixture thus obtained was charged into an internal combustion rotary kiln of 300 mm. in diameter and approximately 3,000 mm. in length and roasted, whereby the manganese components were converted into MnO. The roasting temperature of the kiln was 800° C. and the composition of the exhaust gas was as follows: 3–5% of CO; less than 0.2% of $O_2$; balanced $CO_2$ and $N_2$. By roasting for 40 minutes, a reduced-roasted product containing 1.2% of potassium, 1.5% of $MnO_2$ and 53.0% of MnO based on the roasted product was obtained.

1.5 kg. of thus obtained reduced-roasted ore and 3 kg. of the water were charged into a 5 l. capacity of autoclave made of carbon steel equipped with a stirrer and the extraction of potassium components from the ore was carried out at a temperature of 185° C. under agitation for an hour. Thereafter the treated ore was separated by filtering and washed with warm water, whereby there was obtained an ore containing a decreased amount of potassium of 0.25% based on the dry ore. The pH of the filtrate was approximately 13. To the ore containing the decreased amount of potassium was added about 10 l. of 12% dilute solution of sulfuric acid, and and the mixture thereof was heated and kept at a temperature of 60° C. to extract the manganese components. Furthermore, an aqueous hydrogen peroxide solution was added into the mixture to oxidize a small amount of ferrous ion extracted into the solution to ferric ion, and the solution was neutralized with milk of lime, then the insoluble residue was separated. There remained about 9 l. of an aqueous manganese sulfate solution containing 6% of Mn and 0.02% of K.

An electrolytic oxidation was carried out using the thus obtained manganese sulfate solution as the feed solution for the electrolyte under the following conditions, and 0.85 kg. of electrolytic manganese dioxide containing 0.04% of potassium based on the dry product was obtained.

Condition for electrolysis:

Anode and cathode material—Graphite.
Temperature of electrolyte—90° C.
Anode current density—1.0 a./dm.$^2$.
Composition of electrolyte:
  $Mn^{++}$—20 g./l.
  $H_2SO_4$—60 g./l.

Example 2.—2 kg. of the reduced-roasted ore containing 1.2% of potassium prepared in Example 1 and 2 kg. of water were charged into a 5 l. capacity of autoclave made of carbon steel equipped with a stirrer and the extraction potassium components was carried out at a temperature of 185° C. under agitation for an hour, while a dilute solution of sulfuric acid was added into the autoclave little by little to adjust the pH of the extracting liquid to approximately 10.5. After the extraction, the thus treated ore was separated by filtering and was washed with warm water. An ore was obtained containing a decreased amount of potassium of 0.13% based on the dry ore. Further, by extracting the manganese components from the ore in a manner similar to that described in Example 1, about 12 l. of an aqueous manganese sulfate solution containing 6% of manganese and 0.013% of potassium was obtained.

To the solution was added approximately 65 l. of a 10% solution of ammonium persulfate, whereby divalent manganese ion was oxidized, and then 1.2 kg. of synthetic manganese dioxide containing 0.03% of potassium based on the dry product was obtained.

Example 3.—10 l. of an aqueous manganese sulfate solution containing 6% of manganese and 0.013% of potassium which was obtained in the same way as described in Example 2, was added dropwise to a 10% aqueous solution of sodium hydroxide under aeration, whereby divalent manganese ion was converted into manganese trihydroxide. After separating out the manganese trihydroxide by filtration, the hydroxide was subjected to a disproportionation reaction by contacting same with 50% sulfuric acid solution, whereby 0.52 kg. of synthetic manganese dioxide containing 0.08% of potassium based on the dry product was obtained.

Example 4.—1.5 kg. of the reduced-roasted ore containing 1.2% of potassium which was obtained in Example 1 and 3 kg. of water were charged into a 5 l. capacity autocltve made of carbon steel equipped with a stirrer and the extraction of potassium components was carried out under agitation for 3 hours, while the temperature was kept at 135° C. During the extraction a dilute sulfuric acid solution was added to the autoclave little by little, and the pH of the extracting liquid was adjusted to approximately 9. After the extraction, by filtering and washing with warm water an ore was obtained containing a decreased amount of potassium of 0.25% based on the dry ore.

Furthermore, 9 l. of a manganese sulfate solution containing 6% of manganese and 0.02% of potassium was prepared by extracting manganese components from the thus obtained ore in a similar manner as described in Example 1, except that a 9% dilute solution of hydrochloric acid was used instead of the 12% dilute solution of sulfuric acid.

To the thus prepared solution was added 40 l. of a solution of sodium hypochlorite (content of available chlorine being 2%) and divalent manganese ion in the solution was oxidized, whereby 0.9 kg. of synthetic manganese dioxide containing 0.05% of potassium based on the dry product obtained.

Example 5.—1.5 kg. of reduced-roasted ore containing 1.2% of potassium which was obtained in Example 1, and 3 kg. of water were charged into a 5 l. capacity vessel equipped with a stirrer, and the potassium components were extracted under atmospheric pressure, while a temperature at about 100° C. was maintained for 6 hours. During the extraction, a dilute sulfuric acid solution was added little by little to adjust the pH of the extracting liquid to approximately 8. After the extraction, by filtering and washing with warm water, an ore was obtained containing decreased amount of potassium of 0.45% based on the dry ore. By extracting the ore in the same manner as described in Example 1, approximately 9 l. of a solution of manganese sulfate containing 6% of manganese and 0.04% of potassium was obtained.

By electrolytically oxidizing the thus prepared solution under the same condititons as described in Example 1, 0.83 kg. of electrolytic manganese dioxide containing 0.09% of potassium based on the dry product was obtained.

What I claim is:

1. In a method for preparing manganese dioxide, the steps comprising: roasting and reducing fine particles of naturally occurring manganese oxide ore containing potassium components for a period of time sufficient to convert manganese oxides in the ore into MnO; extracting the roasted and reduced ore with water maintained, at a pH of about 8.0 to about 11.5 and at a temperature of about 100° C. to about 185° C., to obtain an aqueous phase containing dissolved potassium components and to obtained a solid phase of a purified, roasted and reduced, ore material of reduced potassium content; separating the solid phase from the liquid phase; then adding a mineral acid to the solid phase to thereby dissolve the MnO in the solid phase to obtain a manganese salt solution; and then oxidizing the manganese ion in the solution to manganese dioxide.

2. A method as claimed in claim 1, including the step of adding an acid during the extraction step to maintain the pH in said range.

3. A method according to claim 1, in which the amount of water used in the extracting step is in the range of from about 1 to 3 times the weight of the roasted and reduced ore.

References Cited

UNITED STATES PATENTS

| 1,293,272 | 2/1919 | Wells | 23—145 |
| 1,932,413 | 10/1933 | Laury | 23—145 |
| 2,473,563 | 6/1949 | Beja et al. | 23—145 |
| 2,681,268 | 6/1954 | Nossen | 23—145 |
| 2,782,098 | 2/1957 | Bozeman et al. | 23—145 |
| 2,956,860 | 10/1960 | Welsh | 23—145 |
| 3,455,798 | 7/1969 | Mehne et al. | 204—83 |

FOREIGN PATENTS

| 551,471 | 2/1943 | Great Britain | 23—145 |

F. C. EDMUNDSON, Primary Examiner

U.S. Cl. X.R.

204—83